United States Patent [19]

Kendall

[11] Patent Number: 4,779,411
[45] Date of Patent: Oct. 25, 1988

[54] FLEXIBLE, NON-METALLIC RIGGING CHAIN

[75] Inventor: Steven E. Kendall, S. Hadley, Mass.

[73] Assignee: Link Enterprises Corporation, West Springfield, Mass.

[21] Appl. No.: 946,751

[22] Filed: Dec. 29, 1986

Related U.S. Application Data

[63] Continuation-in-part of Ser. No. 803,140, Dec. 2, 1985, abandoned.

[51] Int. Cl.$^4$ .............................................. F16G 13/12
[52] U.S. Cl. ........................................ 59/78; 59/84; 112/417
[58] Field of Search .................. 59/78, 83, 84, 90, 92; 112/417

[56] References Cited

U.S. PATENT DOCUMENTS

| | | | |
|---|---|---|---|
| 429,174 | 6/1890 | Ogilvy | 59/83 |
| 510,134 | 12/1893 | Harris | 59/83 |
| 540,498 | 6/1895 | Klatte | 59/84 |
| 2,840,983 | 7/1958 | Keilbach | 59/83 |
| 3,153,898 | 10/1964 | Gerhardt | 59/84 |
| 3,707,021 | 12/1972 | Norrman | 24/16 R |
| 3,733,811 | 5/1973 | Florjancic | 59/35 |
| 4,232,619 | 11/1980 | Lindahl | 112/417 |

FOREIGN PATENT DOCUMENTS 445701  11/1912  France .................. 59/84

*Primary Examiner*—David Jones
*Attorney, Agent, or Firm*—Chapin, Neal & Dempsey

[57] ABSTRACT

Non-metallic rigging chain formed with a plurality of linked flexible loops. Each loop has a core which consists of a continuous strand of non-metallic materially coiled upon itself. The coiled core material is sheathed within a woven outer fabric. Except for the two terminal loops of each chain, one loop is formed by coiling a continous strand of core material in linked relation within a pair of completed loops. The length of each chain is determined by the diameter of its loops and the number of loops linked together.

7 Claims, 4 Drawing Sheets

FLEXIBLE, NON-METALLIC RIGGING CHAIN

This application is a continuation-in-part of my copending application for "FLEXIBLE, NON-METALLIC RIGGING CHAIN" Ser. No. 06/803,140, filed Dec. 2, 1985, now abandoned.

BACKGROUND OF THE INVENTION

In the rigging trade, steel cable, rope and metal chain are conventionally used for lifting and supporting large and heavy loads. More recently, non-metallic lifting loops have displaced the more conventional type of cable. U.S. Pat. Nos. 4,210,089 and 4,232,619 to Lindahl disclose lifting loops of this type. These lifting loops comprise a core of parallel threads enclosed within a protective covering. U.S. Pat. No. 321,473 discloses a car coupling link having a wire rope core and a metal band welded over the core while U.S. Pat. Nos. 429,174 and 510,134 disclose unsheathed, metallic wire link chain. While the non-metallic loops of Lindahl have reliable lifting characteristics and adequate strength and durability, their principal disadvantage is that they have fixed predetermined length, such as 30 or 50 foot lifting loops. In using these lifting loops, if one required a 24 foot length lifting cable, the excess length would be wrapped around the object or a support beam. These unitary lifting loops accordingly lack the versatility of a lifting chain while having the major advantage of very low weight to strength ratio.

It is the principal object of this invention to provide a linked loop non-metallic chain construction which overcomes the drawbacks of the prior art.

It is another object of this invention to provide a linked loop lifting chain which possesses the advantages of the Lindahl type lifting loops but which is more versatile in use.

It is a further object of this invention to provide a method of fabricating the above type of lifting chain.

The above and other objects and advantages of this invention will be more readily apparent from the following description read in conjunction with the accompanying drawings in which.

Figure 1:
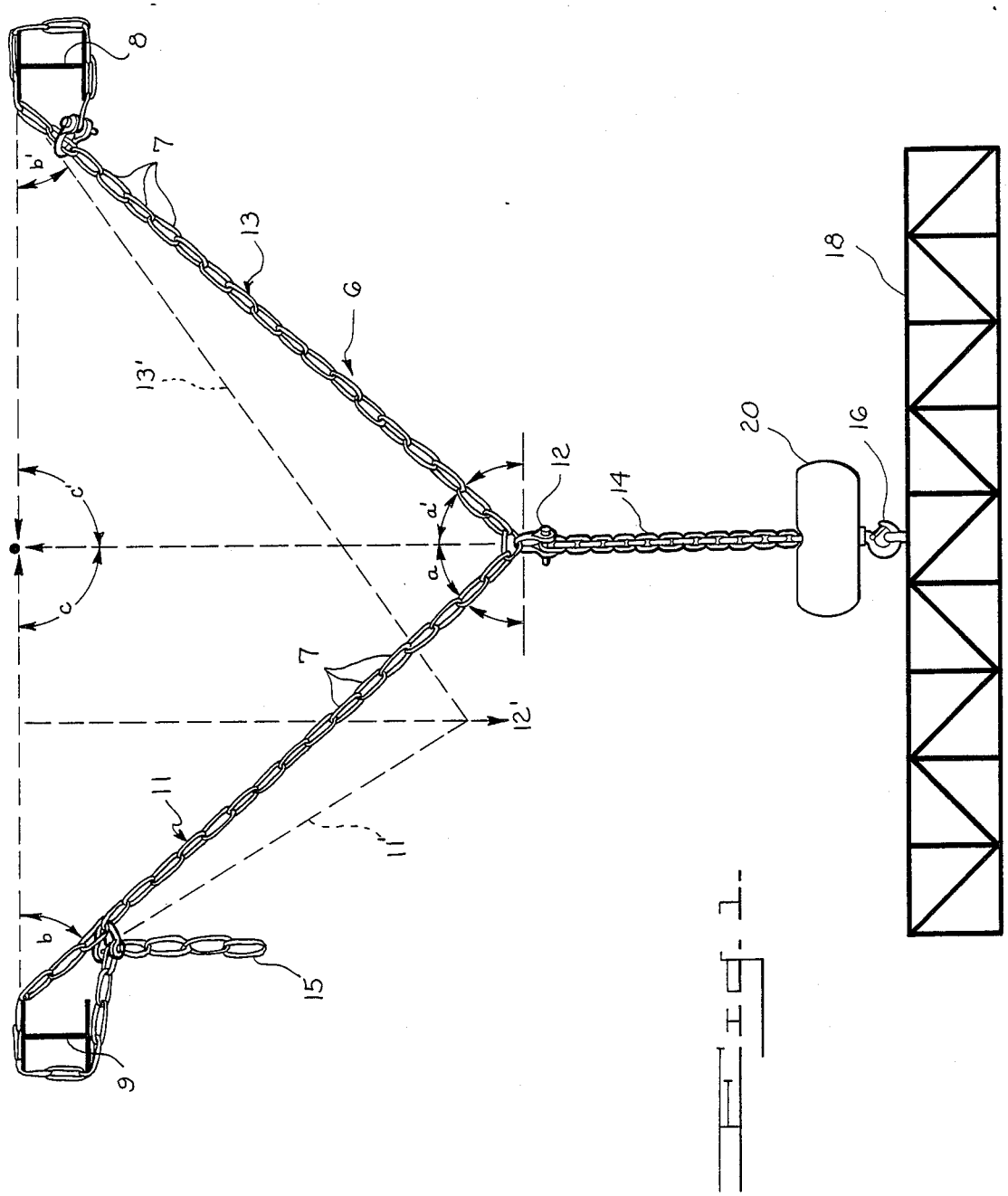
FIG. 1 is an overall view of a lifting chain of the type embodying this invention as it would be typically utilized, such as in stage rigging.

Referring in detail to the drawings, in FIG. 1 is shown a typical application of a rigging chain 6 of the type embodying my invention, consisting of a plurality of linked, endless loops 7. The terminal ends of the chain are fitted around a pair of spaced I-beams 8 and 9. Shackles 10 are used to secure the ends of my chain which is looped around the I-beams 8 and 9. Because of its linked loop construction, the shackles can be coupled to any loop 7 along the length of the chain and then through one of the other loops of the angularly extending leg portions of chains 11 and 13 in a basket hitch arrangement to distribute the load to both legs of the hitch which extend from the shackle around beam 9. This type of hitch connection is preferable to a choke hitch where the shackle is merely fitted around the bridle leg 13, which is illustrated for the end of the chain 6 wrapped around beam 8. The leg portions of chain 11 and 13 may be adjusted by trial and error to the desired length for lifting a load at a particular location and any excess length of chain may simply be allowed to hang downward, as illustrated at 15. The type of rigging illustrated in FIG. 1 is known as a "lifting bridle".

The chain 6 extends in a triangular configuration to a third schackle 12 at the apex of the triangle which is in turn fastened to a lifting chain 14. A hook 16 is engaged with a ring or yoke fitted onto a load 18. A hoisting mechanism 20, such as a motor driven Lodestar, is carried on the metal chain 14.

If a conventional cable were used for lifting bridle in lieu of my linked loop chain, one would first calculate the lengths 11 and 13 needed to extend from each beam 8 and 9 to the load connecting shackle 12 at the apex of the triangle.

A conventional steel link chain could, of course, be used in a manner similar to that illustrated in FIG. 1 but to couple such a chain with conventional steel shackles, the links of the chain would necessarily be quite large in diameter to enable the shackle to fit through the links and thus the weight-to-strength ratio of the chain would be so much greater than that of my non-metallic linked loop chain that it would be most difficult and cumbersome to use in this type of rigging. The chain 6 embodying my invention is not only extremely strong, while being very light in weight, but the loops 7 are relatively large in diameter making it very easy to fit a shackle through any loop 7.

While one could also use one or two lifting loops of the Lindahl type, there is no way that the shackles could be connected or coupled to any point on the chain short of its outer end. The reason for this is that the lifting chain merely consists of one large loop and the chain thus lacks the versatility of my linked loop chain.

In FIG. 1, the first lifting bridle depicted is an isosceles triangle with leg portions 11 and 13 being of equal length. In this situation, the load is located to a point half the horizontal distance between the two I-beams. In this case, each leg portions 11 and 13 would also correspond to the hypotenuse of a right triangle. Angles C and C' would be right angles and in this particular arrangement, angles a, a', b and b' would be 45 degree angles.

Another hypothetical situation is depicted with broken lines in which the load to be lifted and supported is located to the left of the lifting point load 18. It will readily be noted that the leg portions 11' of the chain 6 is now substantially shorter than the leg portion 13'. If one were to use a conventional cable or lifting loop, it would first be necessary to calculate the lengths 11' and 13' using trigonometric relationships. For example, the hypotenuse of any triangle may be calculated using the Pythagorean theorem, i.e., that the square of the hypotenuse of a right triangle is equal to the sum of the squares of the other two sides. When the lengths of the legs 11' and 13' have been calculated, one would then select the correct chain lengths for the particular situation.

On the other hand, using a linked loop chain of the type embodying my invention, it is only necessary to connect one end of the chain around one of the I-beams, such as 8, locate the lifting shackle 12 where needed and then connect the third shackle 10 to the loop 7 of the chain wrapped about beam 9 which results in leg portion 11' being the proper resultant length. It will be noted, moreover, that there is no necessity to wrap the chain 6 a number of times around the beam; the excess chain length may simply be allowed to hang downwardly, as illustrated at 15. Preferably, the basket hitch would be used about both support beams. In another arrangement, two of the lifting chains could be used in place of each leg 11 and 13 of the chain 6 illustrated in FIG. 1. In the latter application, the lower end loops 7 of the two chains would be fitted onto shackle 12.

Figure 2:
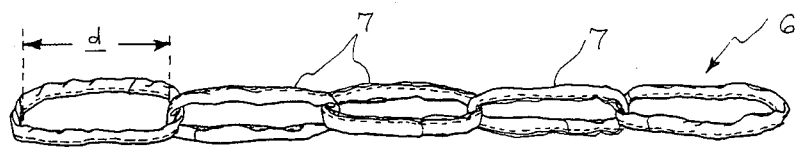
FIG. 2 is a perspective view of a portion of the lifting chain of FIG. 1.
Figure 3:
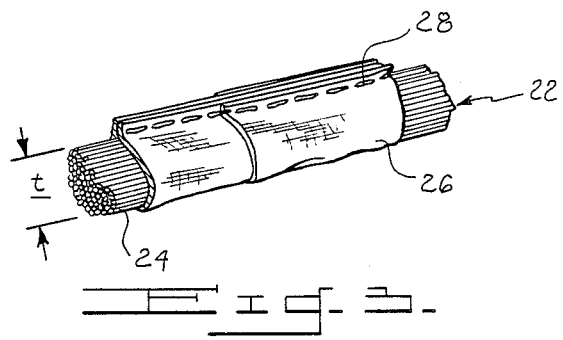
FIG. 3 is a partial perspective view, on an enlarged scale, illustrating the construction of the chain.

The construction of my chain 6 is best illustrated in FIGS. 2 and 3 and consists of endless loops of nonmetallic material linked together to form a chain-like structure. Each loop or link of the chain 6 comprises an inner core 22 in the form of an endless strand, roving or filament 22 of continuous length which is coiled, loop-on-loop in circular configuration about a predetermined diameter which results in a particular or loop length d until a filamentary annulus is generated of predetermined thickness t. I have found it preferable to use standard size loops having an extended or tensioned loop length of one foot. Preferably, the strand material 14 is circularly coiled so that its turns lay in a generally parallel relationship for uniform tensioning under load conditions. When the winding of the core 22 is completed, it is fully enclosed within an outer casing or sheath 26. The sheath 26 may be heavy canvas or a synthetic plastic fabric, such as nylon or polyester. The core is preferably synthetic plastic material, such as polyester, nylon or Kevlar having extremely high tensile strength to weight ratio. The outer sheath 26 may be wrapped about the core 22, its ends overlapped and its side edges stitched longitudinally, as illustrated at 28 in FIG. 3. In place of the stitches 28, it is also contemplated that a closure device of a suitable type, such as Velcro, or a coil type slide fastener may be used along the seam line of the outer sheath. In this way, the sheath may be opened from time-to-time to examine the core in order to verify its integrity.

The basic character of the linked loop chain is that each loop 7 is an open annulus and is loosely linked to two adjacent loops except, of course, for the two terminal end loops of each cable 6. Each loop may be rotated circumferentially and also, about its longitudinal axis, a full 360 degrees for wear distribution at its areas of contact with adjacent loops.

Figure 4:
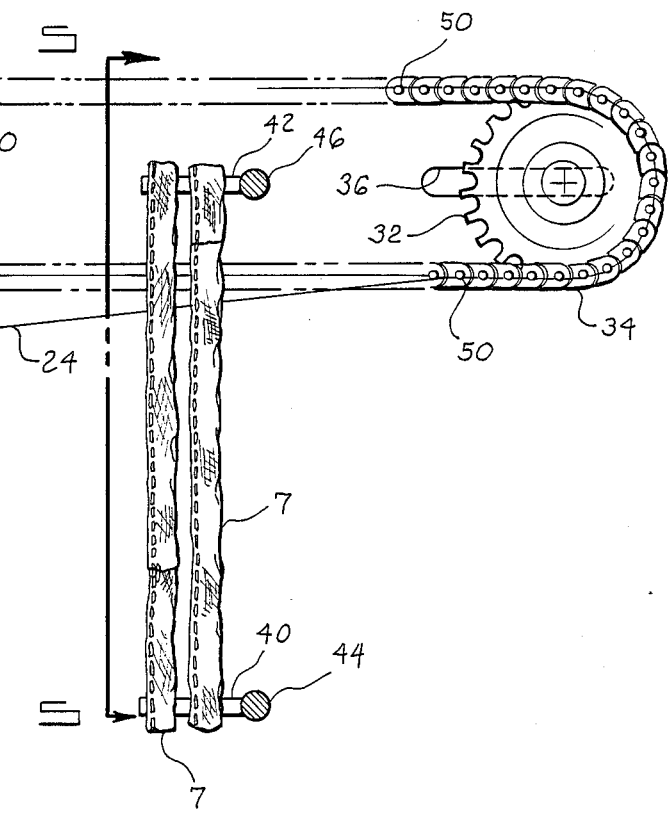
FIG. 4 is a top plan view of one type of apparatus which is adapted to fabricate the chain of my invention.
Figure 5:
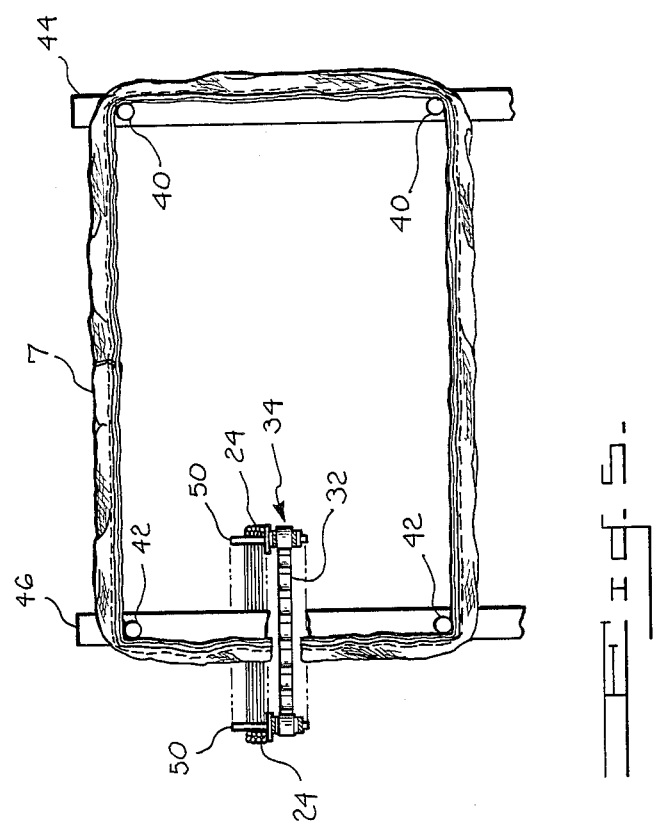
FIG. 5 is a section taken along line 5—5 of FIG. 4.

In FIGS. 4 and 5, one type apparatus is shown which will enable the fabrication of the cable 6. The apparatus comprise a pair of sprockets 30 and 32. A link chain 34, similar to a bicycle chain, is meshed with the teeth of the two sprockets. One of the sprockets 30 is driven by an electric motor (not shown) and the other sprocket 32 is free to rotate and be rotatably driven by the chain 34. The distance between the sprockets may be varied and this connection sprocket 32 is adjustable along a track or slot 36 to enable the fabrication of loops 7 of various lengths of preferably about one foot, with a circumference of about twenty-six inches for each loop. The chain 34 includes one or more detachable links for changing its length and to disconnect the chain to permit the insertion of preformed loops 7. The preformed loops 7 are fitted onto pins 40 and 42 which extend horizontally from a pair of laterally spaced, vertical posts 44 and 46. In this manner, the chain 34 forms an endless loop which is linked to track within the preformed loops 7. In most cases, two preformed loops would be mounted in side-by-side relation, as shown in FIG. 4.

The chain 34 comprises links with generally planar upper surfaces. Pins 50 extend upwardly from the upper surface of the links, as best illustrated in FIG. 5. The pins serve as a loop forming or guide means by which the core strand is uniformly coiled upon itself in the desired pattern.

After inserting the loops 7 into the loop of the chain 34, as shown, one end of the core forming strand 24 is suitably affixed to one of the pins 50.

A spool 52 of the strand material is rotatably mounted on a shaft 54 disposed adjacent the path of travel of the chain 34. As the chain is driven by drive sprocket 30, strand 24 is withdrawn from the supply spool 52 and would continuously for a preselected number of turns. Upon completion of the core winding procedure, the strand 24 is severed and the completed core lifted from the pins 50. The chain 34 loop may then be opened and the three linked loops 7 removed from the coiling apparatus. This procedure will be repeated until a chain of predetermined overall length is constructed. After a core 22 is coiled so as to interlink two other loops, the sheath 26 is applied in a separate operation.

Figure 6:
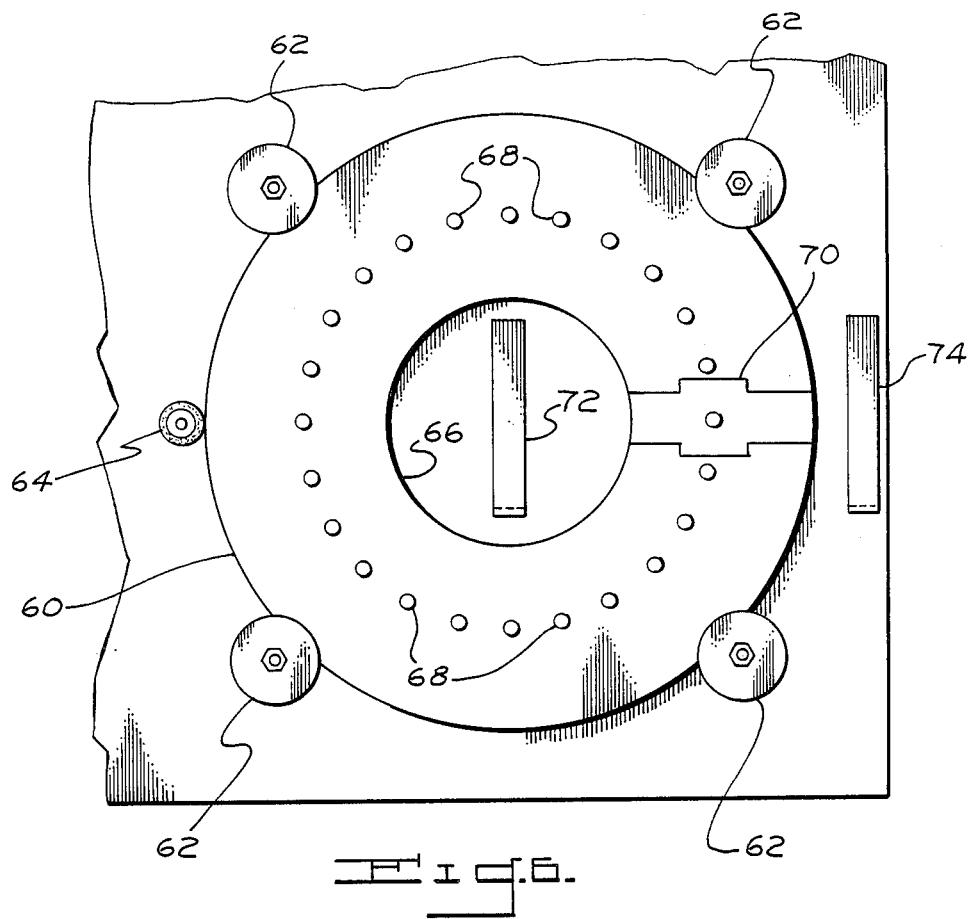
FIG. 6 is a top plan view of a preferred apparatus adapted to fabricate the chain of my invention.
Figure 7:
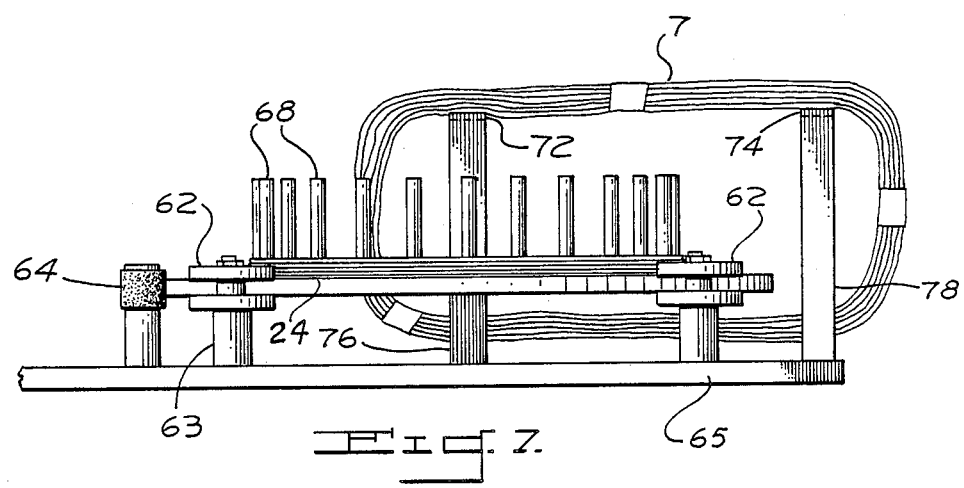
FIG. 7 is an elevational view of the apparatus of FIG. 6.

In FIGS. 6 and 7, is shown the preferred apparatus for use in the fabrication of the cable 6. The apparatus comprises an annular metal plate or disc 60 rotatably supported by a number of equally spaced sheaves 62. A rubber covered drive roll engages the outer surface of the plate 60 to rotate the same about its vertical axis. The drive roll 64 is driven by an electric motor (not shown) and the sheaves 62 are rotatably mounted on vertical shafts 63 which extend upwardly from base plate 65. The rotatable disc 60 includes an inner circular opening 62 and a plurality of pins 68 extending upwardly in circumferentially spaced parallel relation about the disc 60. As shown, the pins are spaced at 15 degree intervals to define a circle having a diameter of about 8.25 inches. Disc 60 includes a removable sector 70 to permit the insertion of preformed loops 7. The loops 7 are fitted onto arms 72 and 74 which extend horizontally from a vertical post 76 disposed within the opening 66 and post 78 outwardly of the disc. In this manner, the pins 68 define a substantially circular loop or annulus adapted to rotate about a path within the opening of annular loops 7. In most cases, two preformed loops 7, either sheathed or unsheathed, would be disposed in side-by-side relation, as shown in FIG. 7.

Pins 68 extend upwardly from the upper surface of the disc 60, as best illustrated in FIG. 7. The pins serve as the hub of a circular spool or guide means onto which the core strand 24 is to be uniformly coiled upon itself in a circular configuration.

After fitting the loops 7 about the annular disc, as shown in FIG. 7, one end of the core forming strand 24 is suitably affixed to one of the pins 68. A spool of the strand material is rotatably mounted on a shaft disposed adjacent the path of rotation of the disc 60 in much the same manner as depicted in FIG. 4. As the disc is driven by drive roll 64, strand 24 is withdrawn from the supply spool and wound continuously for a preselected number of circular turns. Upon completion of the core winding procedure, the strand 24 is severed and the completed multistrand core is taped at circumferentially spaced locations and the core is lifted upwardly off the pins 68. Sector 70 is then removed from the plate and the three linked loops 7 are thus removed from the coiling apparatus. The procedure will be repeated until a chain of predetermined overall length is constructed. After a core 22 is coiled so as to interlink two other loops, a sheath 26 is applied about each in a separate operation.

I have found it advantageous to number each loop 7 consecutively from one end to the other of the chain 6. Thus, a thirty foot chain will have thirty numbered links. This greatly simplifies duplicating any particular bridle hitch since the user will know, for example, exactly which numbered link to couple to each shackle. In addition, the middle of each chain will be distinctively marked or colored differently from the other loops, thus indicating the center of the chain.

While the apparatuses of FIGS. 4–7 are shown being used to interlink one loop with one or two preformed loops, it could, of course, also be used to simply fabricate the core portions 22 of individual loops 7. A supply of such individual loops could be maintained on inventory for subsequent incorporation into a flexible chain by being interlinked with loops formed in situ, as herein described.

In the event any portions of my linked loop rigging chain 6 becomes worn or frayed, the worn loops can be cut out and relaced using my method and an apparatus of the type depicted in FIGS. 4–7. The remaining loops can, of course, be reused in the repaired chain.

Because of my chain construction in which each loop 7 is freely rotatable, relative to each other loop and about its longitudinal axis, the tendency for wear or chafing at any fixed point where the loops are in contact is minimized.

Having thus described my invention, what is claimed is:

1. Flexible rigging chain comprising a plurality of conformably flexible loops linked together, each loop defining an annulus including a core portion formed by a non-metallic strand coiled endlessly in a predetermined loop size and being sheathed in an unconsolidated condition within a flexible outer casing, each loop of the chain being interlinked with at least one other loop of generally the same construction, whereby each strand of said chain is adapted to be uniformly tensioned.

2. Flexible rigging chain as set forth in claim 1, in which each loop comprises a core formed of a circularly wound synthetic plastic strand of multiple loops and said outer casing being a textile material.

3. Flexible rigging chain as set forth in claim 2, in which said textile material is a synthetic plastic fabric and said loops are of generally uniform ring size.

4. Flexible rigging chain as set forth in claim 3, in which each loop of said chain has a longitudinally tensioned length selected in multiples of one foot and each loop is consecutively numbered from one end of the chain to the opposite end thereof.

5. Flexible rigging chain as set forth in claim 3, in which each loop of said chain is rotatable relative to the loops with which it is linked.

6. Method of fabricating a rigging chain comprising the steps of forming a first loop by endlessly coiling a flexible, non-metallic strand to form a circular annulus of predetermined size, forming a second loop by endlessly coiling a flexible, non-metallic strand into another annulus of predetermined size in which the endlessly coiled strand of the first loop and the endlessly coiled strand of the second loop are non-detachably interlinked together in a chain-type structure, and sheathing each loop making up said chain within a flexible outer casing material.

7. Method of fabricating a rigging chain as set forth in claim 6 in which the outer sheathing material is provided with a releasable closure means to enable periodic inspection of the core strand of each loop.

* * * * *